United States Patent [19]

Graffin

[11] 4,297,161
[45] Oct. 27, 1981

[54] METHOD AND APPARATUS FOR HEAT-SEALING LIDS ON GLASS CONTAINERS

[75] Inventor: Andre J. Graffin, La Ferté Bernard, France

[73] Assignee: Serac, France

[21] Appl. No.: 171,182

[22] Filed: Jul. 22, 1980

Related U.S. Application Data

[63] Continuation of Ser. No. 952,227, Oct. 17, 1978, abandoned.

[30] Foreign Application Priority Data

Nov. 3, 1977 [FR] France ............................... 77 33046

[51] Int. Cl.³ .................. B30B 5/02; B30B 15/34; B65B 7/28
[52] U.S. Cl. .................................. 156/583.3; 53/420; 53/478; 53/488; 100/54; 100/61; 100/211; 156/69; 156/212
[58] Field of Search .................. 53/420, 478, 488; 93/36.3, DIG. 1; 100/54, 61, 211; 156/69, 382, 583.3, 212; 229/5.5

[56] References Cited

U.S. PATENT DOCUMENTS

| 2,671,493 | 3/1954 | Olson | 100/211 X |
| 3,964,958 | 6/1976 | Johnston | 156/382 |
| 4,016,021 | 4/1977 | La Fleur | 156/154 |
| 4,050,971 | 9/1977 | Verkins et al. | 156/69 |

*Primary Examiner*—Robert A. Dawson
*Attorney, Agent, or Firm*—Steele, Gould & Fried

[57] ABSTRACT

An apparatus for heat sealing composite lids, made of a laminate of a light ductile alloy coated with a layer of thermoweldable plastic material, on glass containers. The apparatus applies, under pressure, a flexible membrane onto said lid while disposed in position on the mouth of a glass container. The membrane is a simple sheet stretchingly supported by its outer periphery on a movably and hingedly supporting frame. The side of said membrane opposite said lid is subjected to a controlled heat flow, thus sealing the lid to the container.

4 Claims, 3 Drawing Figures

METHOD AND APPARATUS FOR HEAT-SEALING LIDS ON GLASS CONTAINERS

This is a continuation, of application Ser. No. 952,227, filed Oct. 17, 1978, now abandoned.

FIELD OF THE INVENTION

The present invention relates to a method and a device for closing packaging containers with lids or caps, and more particularly for sealingly closing glass containers by heat sealing lids thereto.

BACKGROUND OF THE INVENTION

Closing of glass packaging containers, more particularly in dairying, is generally obtained by crimping aluminum lids, said lids being crimped or wrapped on the rim of the mouth of containers such as bottles in the milk industry or yogurt cups.

Such a crimping is not tight and care must be observed when handling the containers. Moreover, for alimentary foods such as milk, yogurt or cream, said crimped closing is not air-tight and accordingly the product contained within the container is not prevented from contact with the surrounding atmosphere. Such contact promotes undue fermentation and oxidation of said product.

Increased development of thermoplastic containers has made it possible to close such containers by fusion welding or sealed bonding by making use of composite lids comprised by a foil of aluminum and a layer of a thermoweldable plastic material. When applying the closing head of a closing tool onto the mouth of such containers, there is automatically obtained a thorough contact between the lid and the end surface of the mouth even if said surface is not previously exactly flat owing to the ability of the plastic material of the container to be crushed and to be creeped when heated by the closing head.

The utilization of such techniques for sealing glass containers raises difficulties in that said containers, which are generally made by molding, have uncontrolled local distortions, when cooled out of the mold, especially in the mouth area thereof. It results therefrom that the upper or outer portion of the mouth is not exactly flat and generally extends substantially in a plane which is not parallel to the base of the container. The upper rim of the mouth generally shows noticeable buckling with local dimensional variations up to about 3/10 of a millimeter.

Due to said irregular shape of the mouth of glass containers, it is not possible, with conventional closing apparatus, to obtain a sealed closing of the containers since sealed closing requires a perfect contact between the lid and the entire contact surface of the mouth.

In order to avoid such drawbacks, it has been proposed to make use of closing devices embodying a cushioning pad made from a resilient material capable of accomodating local level variations of the container mouth and adapted for transmitting heat and applying a force which is enough for achieving heat sealing of the container in the considered temperature conditions.

However, said devices show difficulties in conveniently transmitting heat through said distortable cushioning pad due to the lower thermal conductivity of the material of said pad. The addition in said material of substances showing good thermal conductivity results generally in an increased rigidity of the pad which is detrimental for the heat sealing or closing of relatively fragile containers, for example those of the non-return type such as those for packaging liquid or semi-liquid alimentary products. With such closing devices, it is difficult to achieve a balance between the desired flexibility of the pad in order not to require excessive high pressure conditions in the closing operation prone to injure, e.g. break the containers, and desired convenient heat conductivity to avoid excessively high power sources for generating heat.

OBJECTS OF THE INVENTION

Accordingly, one object of the invention is to avoid such drawbacks by providing a method for heat sealing composite lids having a thermoweldable thermoplastic layer onto glass containers, which ensures a tight sealing of said lids on container mouths showing even noticeable buckling.

There is another object of the invention to provide an improved device for carrying out such a method which is strong, serviceable, which is of a low manufacturing cost and which only requires reduced energy consumption.

There is another object of the invention to provide such a heat sealing device of a great versatility for a wide range of glass containers, which is easy to operate and shows an improved reliability.

SUMMARY OF THE INVENTION

According to the present invention, a method for closing packaging containers or the like with composite lids having a thin metallic layer and a thermoplastic fusion weldable layer comprises the steps of placing the lid in position onto a container to be closed, pressure applying onto said lid in position on the container a flexible membrane stretched by its outer periphery on a movable supporting frame, subjecting the side of said membrane opposite said lid to a controlled heat flow, and separating said membrane from said lid thus heat sealed onto said container.

According to another feature of the present invention, a device for closing containers comprises a flexible membrane stretched by its outer periphery on a supporting frame mounted at one end of a movably and hingedly supported body, heat transfer means provided in said body, and heating means for transmitting, through said heat transfer means, a heat flow to said side of said membrane.

According to a further feature of the invention, the membrane is metallic and is stretched on the body so as to be adapted to selectively contact its side opposite to the lid against an adjacent overlaying metallic surface in said body, said body serving itself as said heat transfer means. Pressure fluid feeding means are provided in said body for selectively urging said membrane away from said metallic surface of said body and for pressure applying said membrane onto the container mouth covered by the lid.

According to an alternative feature of the present invention, the membrane is non-metallic and said heat transfer means is a fluid showing a good thermal conductivity contained within the body and in permanent contact with at least a part of said side of the membrane opposite to said lid to be heat sealed.

BRIEF DESCRIPTION OF THE DRAWINGS

The invention will be now described in detail by way of examples, with reference to the accompanying drawings, in which.

DETAILED DESCRIPTION OF THE PREFERRED EMBODIMENTS

Figure 1:
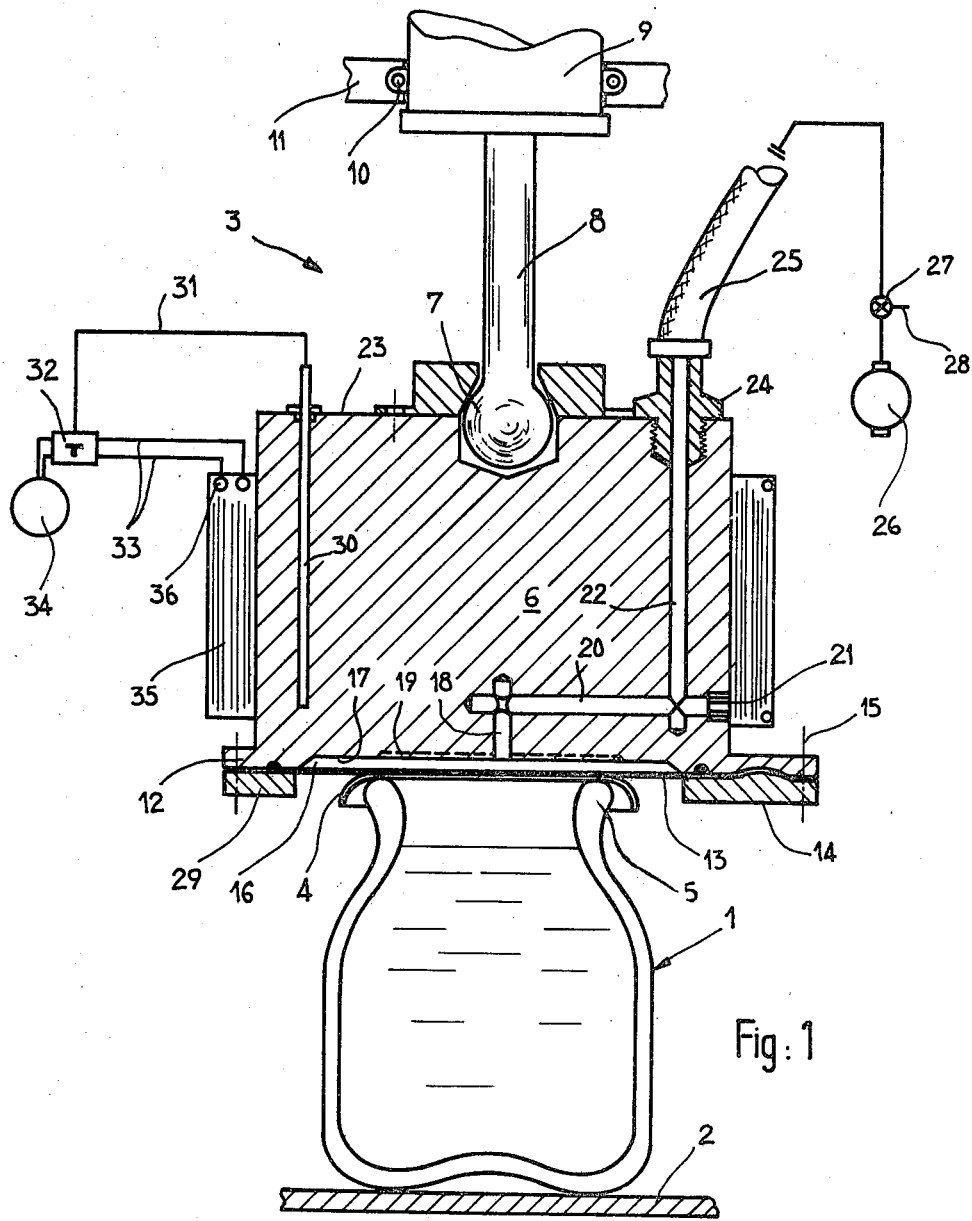
FIG. 1 schematically shows, in vertical cross-section, a first embodiment of a heat sealing device of the invention.

In the drawings, the heat sealing device of the invention is supposed as constituting a sealing station at a filling plant for filling glass containers, and is shown with such a glass container in position at the filling station under the heat sealing device. A glass container, generally designated by reference numeral 1, for instance a yogurt pot, has been filled at the filling station (not shown) and is conveyed in a filled state to the sealing station by a conveying device which is depicted on the drawing only by a supporting plate 2 which extends below a closing head, generally designated by reference numeral 3. Between the filling station and the sealing station, a thermoweldable composite lid 4 has been placed and positioned on the container mouth 5 in a manner known in the art. Such a lid conventionally comprises a thin metallic foil of a light alloy, for instance aluminum, having bonded to the face directed to the container a layer of a thermoweldable plastic wax or lacquer, such as those sold under the brand reference "*Complexe* 24857 *Aluthène* 50 IV 801.C" by the Société Alsacienne d'Aluminum or under the reference "Complexe n°1" by the Société Morin.

The sealing head 3 comprises a body 6 having at least a metallic core, for instance of steel or preferably of stainless steel, which is hingedly supported, for instance by a hinge ball joint 7 or the like, at the outer end of a rod 8 of a cylinder 9. The sealing head 3 may be, for instance, actuated hydraulically, and is affixed, for instance by means of tabs 10, to a frame 11 of the sealing station in the filling apparatus. Said frame 11 is advantageously a part of a rotating structure arranged downstream a rotating filling device.

Preferably the body 6 has generally a cylindrical shape and is provided, at its lower end opposite to the cylinder rod 8, with a radially outwardly extending flange 12 integral therewith, onto which an impervious flexible membrane 13 is stretched by its outer periphery, by means of an annular clamping flange 14 which is attached to the lower face of the flange 12, for instance by screws as schematically shown at 15. The body 6 is shaped so as to provide, above the central portion of the membrane 13, a cylindrical chamber 16 of a reduced height having a diameter greater than the nominal diameter of the mouth 5 of the container 1 to be closed. The membrane 13 is advantageously a thin metallic plate, for instance of steel.

Figure 2:
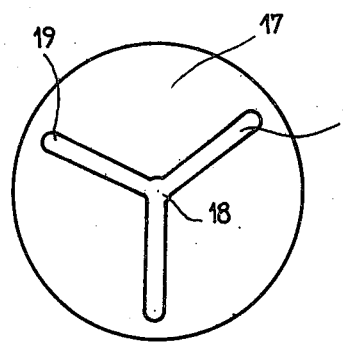
FIG. 2 is a partial view from below the lower contact face of the body showing said lower contact face; and, FIG. 3 schematically shows in vertical cross-section a second embodiment of a heat sealing device of the invention.

The cylindrical chamber 16 is terminated at its upper end by a substantially flat surface 17 in which opens a central bore 18 in the body. Angularly spaced radially extending grooves 19, for instance at a number of three and radially equally-spaced from 120° (FIG. 2), are formed in the flat surface 17 and extend from the opening end of the central bore 18. The inner part of the central bore 18 communicates with a radial bore 20 sealed at its drilling end in the outer wall of the body 6 by a plug 21. A bore 22, for instance parallel to central bore 18, establishes a communication between radial bore 20 and the upper surface 23 of the body 6. A union 24, screwed within the upper end portion of the body 6, is provided for connecting the bore 22 with pressure feeding tubing 25, which is connected to a compressor or an air pressure source 26 through an electro-valve 27. The control electric inlet 28 of the electro-valve 27 may be connected to a control device (not shown) adapted for operating said electro-valve in synchronism with the integers of the considered sealing station in the filling apparatus.

An O-ring 29 may be disposed between the clamped outer periphery of the membrane 13 and the lower end of the body 6. Within said body 6 is also embedded a temperature probe 30, for instance a copper-constantan thermocouple, which may be connected by a line 31 to a temperature control device 32, for instance a thermostat, interposed in electrical leads 33 connecting an electrical power source 34 to a heating collar 35 which surrounds the lateral periphery of the body 6, and which comprises a plurality of electrically resistive windings 36.

The device of the invention functions as follows: the sealing head 3 being in its upper position, i.e. with the cylinder rod 8 retracted within the cylinder 9 by means of controllable cylinder actuating means (not shown) coupled to the above mentioned synchronization control device, the conveying device 2 brings a filled container 1, on which has been previously deposited a lid 4 with its outer edge slightly folded down, straight below the sealing head 3 as shown in FIG. 1. The cylinder 9 is then operated to lower the head 3 so as a first step the membrane 13 comes into contact with the lid 4 on the mouth 5 of the container. A further downward displacement of the head is continued until the membrane 13, which is in pressure contact with the mouth of the container 1 with inter-position of the lid 4, comes into contact with the upper surface 17 of the inner chamber 16 within the body 6. The downward displacement of the head is then stopped. The body 6 is maintained at a substantially constant temperature by the heating collar 35, for instance about 250° C., whereby the membrane 13 in pressure contact with the relatively hot surface 17 of the body 6 has its temperature rapidly increased. Due to the lower thermal inertia of the metallic membrane 13, the temperature of the membrane is raised within about 2 to 3 seconds to the temperature required for achieving fusion welding of the thermoplastic layer of the lid 4 on the container mouth. The electro-valve 27 is then actuated to feed, through tubing 25, bores 22, 20 and 18 and grooves 19, air under pressure, for instance at a pressure of about 2.5 to 3 kg/cm$^2$, to the upper surface of the membrane 13, so as to exert onto the lid 4, with its thermoplastic layer in its softened sealing state, the pressure required for tightly heat sealing the lid on the container 1. The electro-valve 27 is then actuated so as to relieve pressure from chamber 16 and the head 3 is raised, through actuation of cylinder 9, and brought back to its upper position. Closed container 1 is withdrawn and a following container 1 with a non-sealed lid thereon is brought to the sealing position shown in FIG. 1.

Figure 3:
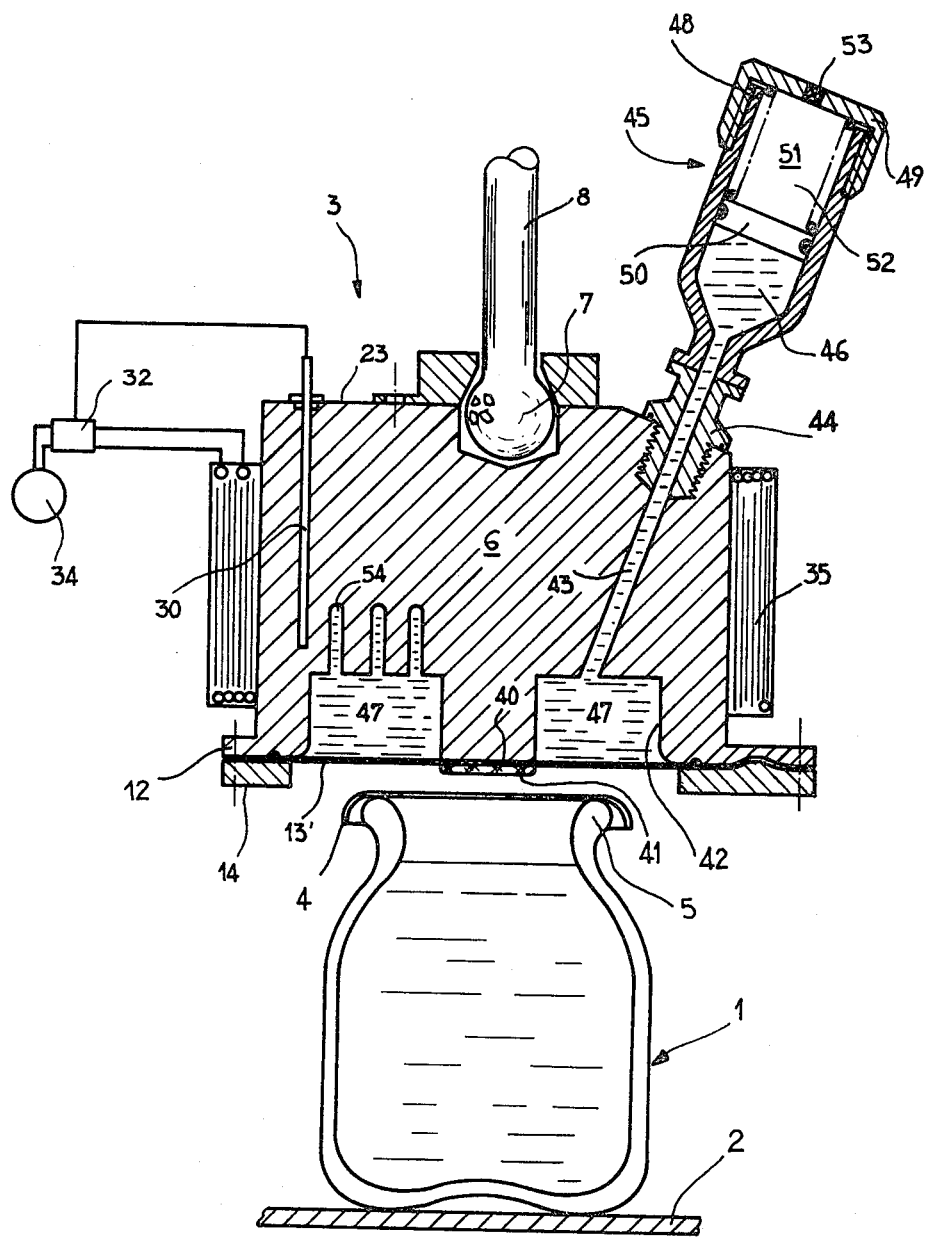

There is shown in FIG. 3 another embodiment of the heat sealing device of the invention. In FIG. 3, the integers which are identical to the integers of the first embodiment of FIG. 1 have the same reference numerals as in FIG. 1. Said second embodiment distinguishes over the first embodiment in that the membrane 13' is here made of a non-metallic material, for instance a fiber glass cloth coated with polytetrafluoroethylene known under the trade mark Teflon. As in the precedent embodiment, the membrane 13' is stretched with its outer periphery clamped between the flange 12 of the body 6 and the annular flange 14. However, in said embodiment, the upper surface of the inner portion of the membrane 13' bears onto a central bearing surface 40 of a central portion of the body 6, said central surface 40 extending in the same plane as the contacting plane between the flange 12 and the annular flange 14, i.e. the plane of the membrane in its normally stretched rest position. On the central portion of the membrane 13 and opposite to central bearing surface 40 is attached, e.g. bonded, on the lower or outer surface of said membrane 13, a cylindrical spacing member 41 of a small thickness.

An annular chamber 42, the inner and outer diameters of which are determined with respect to the nominal diameter of the mouth of the container 1 to be closed, is formed within the lower portion of the body 6 around said central portion terminated by said central bearing surface 40. A bore 43 within the body 6 establishes a communication between said chamber 42 and the upper part of the body 6. A union 44, screwed within the body 6, is provided for connectingly supporting an expansion casing 45 so as to establish a communication between the inner working chamber 46 of said expansion casing and the annular chamber 42.

Said chamber 42 is filled with a heat transfer fluid 47, preferably a substantially incompressible liquid showing a good thermal conductivity, for instance oil, which is maintained under a slight over pressure by a spring 48 within the expansion casing 45 compressed between the adjustably screwed cap 49 of the expansion casing 45 and the sliding piston 50 thereof. Alternatively, or in addition to the spring 48, an inert gas under pressure 51, for instance nitrogen, may be provided within the second chamber 52 of the casing 45, a safety pressure valve 53 being provided within the cap 49.

In said embodiment, unlike the first embodiment and since the non-metallic membrane 13' has a thermal conductivity far lower than the metallic membrane 13, said membrane 13' is permanently held at a relatively high temperature by the heated oil 47 within the annular chamber 42. On the other hand, the elasticity of said membrane 13' being greater that the metallic membrane 13, the provision of the spacing member 41 permits achievement of a doughnut-shaped distortion of the non supported annular portion of the membrane when coming in pressure contact with the mouth 5 of the container 1 so as to better match the contour thereof. The counter pressure created within the incompressible heat transfer medium 47 as a result of the slight protrusion of the membrane within the chamber 42, when said membrane is raised by the mouth of the container brought in pressure contact thereagainst, here allows the heating and the application of pressure onto the thermoweldable lid 4 positioned on the mouth 5 of the container in a single step. In order to improve heat exchange between the mass of the body 6 and the heat transfer fluid 47, the annular chamber 42 is advantageously provided with outwardly extending grooves 54 extending within the mass of the body 6 and formed for instance by electroerosion.

In said embodiment, the container to be closed is conveyed straight below the sealing head 3 with said sealing head in its upper position, as disclosed in reference with the first embodiment. Afterwards the sealing head is lowered in a single run onto the container 1 so as to realize simultaneously the fusion of the thermoplastic layer of the lid and the application under pressure of the lid onto the mouth 5 of the container. Duration of the closing step is about 3 seconds.

Alternatively in the first embodiment, in lieu of air under pressure, use can be made of a liquid under pressure, for instance oil, in order to improve thermal exchange between the body and the metallic membrane. In the same manner, instead of having heating means constituted by a heating collar surrounding the periphery of the body 6, said heating means may be embedded within the body 6. Said embedded heating means may comprise electrical windings, conduits for a liquid or steam at a high temperature, or microwave generating means.

As concerns the second embodiment, depending upon the diameter of the mouth of the containers to be closed and upon the working pressure required for obtaining heat sealing of the lid thereto, the central surface 40 may be omitted, as also the spacing member, the inert chamber of the heat transfer fluid having thus any convenient shape but being provided with at least a lower annular portion corresponding substantially to the nominal diameter of the mouth of the container to be closed. The closing of orifices formed within unflat surfaces, for instance convex surfaces, may be accomplished with such a configuration of the heat sealing device of the invention.

Changes in details may be made without departing from the spirit or the scope of my invention as defined by the appended claims.

What I claim is:

1. A device for sealing a heat-sealable composite lid onto a glass container, said lid comprising a foil of a ductile light alloy coated on one side with a layer of heat sealable thermoplastic material, said device comprising:

means for supporting said container;

a hingedly and movably supported applying head, having a supporting frame, a flexible membrane supported by its outer periphery on said supporting frame, so as to extend in rest position substantially in a plane, said membrane having an outer contacting surface and an inner face, a heat transfer mass arranged on the side of said inner face of said membrane and means for controllably heating said heat transfer mass;

means for selectively and controllably displacing toward and away from each other said applying head and said container supporting means; and, said applying head further comprising a metallic body on one end of which is mounted said membrane supporting frame, said body being provided with at least one inner chamber closed by at least a portion of said inner face of said membrane, said membrane consisting of a simple metal sheet which is not self-heating, said metallic body forming said heat transfer mass, said inner chamber having a relatively small thickness and being limited, on the side opposite said membrane, by a substantially flat face of said metallic body, said inner face of said membrane being adapted for coming into contact engagement with said flat face as a result of a distortion of said membrane caused by said container during relative displacement one toward the other of said container supporting means and of said applying head.

2. The device of claim 1, said metallic body further comprising conduits for supplying fluid under pressure, said conduits opening on said substantially flat face of said metallic body.

3. The device of claim 2, further comprising means for selectively supplying pressurized fluid to said conduits.

4. The device of claim 3, wherein said substantially flat face of said metallic body further comprises radially extending grooves, said conduits in communication with said grooves.

* * * * *